United States Patent
Nakano et al.

(10) Patent No.: US 12,060,115 B2
(45) Date of Patent: Aug. 13, 2024

(54) ELECTRIC DRIVE DEVICE AND ELECTRIC POWER STEERING DEVICE FOR SUPPRESSING PRESSURE FLUCTUATIONS AND WATER PENETRATION

(71) Applicant: HITACHI AUTOMOTIVE SYSTEMS, LTD., Hitachinaka (JP)

(72) Inventors: Kazuhiko Nakano, Hitachinaka (JP); Takuro Kanazawa, Hitachinaka (JP); Hideyuki Hara, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 735 days.

(21) Appl. No.: 17/251,405

(22) PCT Filed: Jun. 12, 2019

(86) PCT No.: PCT/JP2019/023187
§ 371 (c)(1),
(2) Date: Dec. 11, 2020

(87) PCT Pub. No.: WO2019/240146
PCT Pub. Date: Dec. 19, 2019

(65) Prior Publication Data
US 2021/0323600 A1    Oct. 21, 2021

(30) Foreign Application Priority Data
Jun. 14, 2018  (JP) .................. 2018-113270

(51) Int. Cl.
*H02K 5/10* (2006.01)
*B62D 5/04* (2006.01)
*H02K 5/20* (2006.01)

(52) U.S. Cl.
CPC .......... *B62D 5/0406* (2013.01); *B62D 5/0424* (2013.01); *B62D 5/0481* (2013.01);
(Continued)

(58) Field of Classification Search
CPC .......... H02K 5/10; H02K 11/20; H02K 11/21; H02K 11/215; H02K 11/22; H02K 11/225;
(Continued)

(56) References Cited

U.S. PATENT DOCUMENTS

| 2003/0173920 A1* | 9/2003 | Tominaga ............ B62D 5/0406 |
| | | 318/432 |
| 2009/0206709 A1* | 8/2009 | Kakuda .................... H02K 5/15 |
| | | 310/68 D |

(Continued)

FOREIGN PATENT DOCUMENTS

| JP | 2007124798 A | * | 5/2007 |
| JP | 2015-056235 A | | 3/2015 |

(Continued)

OTHER PUBLICATIONS

Watanabe, Machine Translation of JP2007124798, May 2007 (Year: 2007).*

(Continued)

*Primary Examiner* — Eric Johnson
(74) *Attorney, Agent, or Firm* — FOLEY & LARDNER LLP

(57) ABSTRACT

On the opposite side to an output of a rotation shaft of an electric motor, a ventilation hole communicating between an electronic control unit (ECU) housing space and an electric motor housing space is formed to an end surface wall of a motor housing separating the respective housing spaces. The ventilation hole has a waterproof ventilation part that suppresses water passing but permits the passage of air and
(Continued)

water vapor. This structure eliminated the influence of flying rocks and muddy water from the external environment, and suppresses for a long period of time the internal pressure fluctuation of the ECU housing space and the penetration of water into the housing space. Therefore, the internal pressure fluctuation of the housing space for the ECU and the penetration of water into the housing space for the ECU can be suppressed over a long period of time.

18 Claims, 11 Drawing Sheets

(52) U.S. Cl.
CPC ............... *H02K 5/10* (2013.01); *H02K 5/207* (2021.01); *H02K 2205/09* (2013.01)

(58) Field of Classification Search
CPC ........ H02K 11/24; H02K 11/30; H02K 11/33; H02K 2205/09; B62D 5/04; B62D 5/0403; B62D 5/0406; B62D 5/0421; B62D 5/0424; B62D 5/0481
See application file for complete search history.

(56) References Cited

U.S. PATENT DOCUMENTS

| | | | |
|---|---|---|---|
| 2012/0229005 A1* | 9/2012 | Tominaga | ............. H02K 11/38 310/68 B |
| 2015/0180316 A1 | 6/2015 | Maeshima | |
| 2017/0341680 A1 | 11/2017 | Yano | |
| 2019/0199175 A1 | 6/2019 | Kanazawa | |

FOREIGN PATENT DOCUMENTS

| | | | |
|---|---|---|---|
| JP | 2015-134598 A | 7/2015 | |
| JP | 2017-214048 A | 12/2017 | |
| JP | 2018-038218 A | 3/2018 | |
| WO | WO-2018042988 A1 * | 3/2018 | ........... B62D 5/0406 |

OTHER PUBLICATIONS

International Search Report issued in corresponding application No. PCT/JP2019/023187 dated Sep. 10, 2019, with English translation.
Written Opinion issued in corresponding application No. PCT/JP2019/023187 dated Sep. 10, 2019, with English translation.

* cited by examiner

ELECTRIC DRIVE DEVICE AND ELECTRIC POWER STEERING DEVICE FOR SUPPRESSING PRESSURE FLUCTUATIONS AND WATER PENETRATION

TECHNICAL FIELD

The present invention relates to an electric drive device and an electric power steering device, and particularly to an electric drive device and an electric power steering device incorporating an electronic control device.

BACKGROUND TECHNOLOGY

In a general industrial machine field, although a mechanical system control element is driven by an electric motor, recently, a so-called mechanically and electrically-integrated electric drive device in which an electronic control unit composed of a semiconductor element for controlling the rotation speed and the rotation torque of an electric motor is integrally incorporated in the electric motor has been adopted.

As an example of the mechanically and electrically-integrated electric drive device, for example, in an electric power steering device of a vehicle, the rotation direction and the rotation torque of a steering shaft which is rotated by the operation of a steering wheel by a driver are detected, and, based on the detected values, an electric motor is driven so as to rotate in the same direction as the rotation direction of the steering shaft, to generate steering assist torque. In order to control the electric motor, an electronic control unit (ECU: Electronic Control Unit) is provided to the power steering device.

As a conventional electric power steering device, for example, one described in a Japanese Patent Application Publication No. 2015-134598 (patent document 1) has been known. In the patent document 1, an electric power steering device composed of an electric motor section and an electronic control unit is described. An electric motor of the electric motor section is accommodated in a cylindrical motor housing made of, for example, an aluminum alloy, and a board mounting electronic components of the electronic control unit is accommodated in an ECU housing disposed on the side opposite to the output shaft in the axial direction of the motor housing. The board accommodated in the ECU housing is provided with a power source circuit part, a power conversion circuit part having a power switching element, such as MOSFET or IGBT, for driving and controlling the electric motor, and a control circuit part for controlling the power switching element, and the output terminal of the power switching element is electrically connected with the input terminal of the electric motor via a bus bar.

Then, in the electric power steering device having such a configuration of the patent document 1, an O-ring is provided between a connector case and a heat sink member and between the heat sink member and a motor housing member to form a waterproof structure, so as to suppress the penetration of water from the outside.

However, in the housing space for the electronic control unit, internal pressure fluctuation occurs due to the influence of the heat generation of the electronic control unit itself or the cold air (cold heat) of the outside. Therefore, heretofore, a ventilation hole has been formed to a cover which covers the electronic control unit to cope with the internal pressure fluctuation. However, when the pressure of the housing space becomes lower than that of the outside due to temperature fluctuation, due to the penetration of water from the ventilation hole, failures occur to the electric components of the electronic control unit. Therefore, for example, as shown in FIG. 13, a waterproof ventilation member which suppresses the passage of water and permits the passage of air and water vapor is provided to the ventilation hole formed to the metal cover. In general, a waterproof moisture-permeable film has been used.

As shown in FIG. 13, an electric motor section 60 composing an electric power steering device is composed of a cylindrical motor housing 61 made of, for example, aluminum alloy and an electric motor which is not shown and which is accommodated in the motor housing 61, and an electronic control section is composed of a metal cover 62 which is made of, for example, aluminum alloy and which is disposed on the side opposite to the output shaft in the axial direction of the motor housing 61, and of an electronic control unit which is not shown and which is accommodated in the metal cover 62. In addition, a connecter terminal assembly 63 is fixed to an end surface of the metal cover 62 with a fixing bolt. Then, a ventilation hole is formed in a part of the top surface of the metal cover 62, and a waterproof moisture-permeable film 64 is attached to the ventilation hole.

By this waterproof moisture-permeable film 64, even if water tries to penetrate from the ventilation hole when the pressure of the housing space becomes lower than that of the outside due to temperature fluctuation, the penetration of the water is suppressed by the waterproof moisture-permeable film 64, and since only air passes therethrough, it is possible to cope with internal pressure fluctuation.

In addition, as an electric drive device other than that, in which an electronic control device is integrated, for example, an electric hydraulic control apparatus for an electric brake and for controlling various oil pressure has been known. However, in the following explanation, an electric power steering device will be explained as a representative.

PRIOR ART REFERENCE

Patent Document

Patent Document 1: Japanese Patent Application Publication 2015-134598

SUMMARY OF THE INVENTION

Problems to be Solved by the Invention

However, in the configuration in which a ventilation hole is formed to a metal cover, and a waterproof moisture-permeable film is disposed to the ventilation hole, there is a case where when an electric power steering device is mounted on a vehicle, the electric power steering device is mounted so as to be exposed to the external environment of the under part of the vehicle. Consequently, a phenomenon in which the waterproof moisture-permeable film is broken by flying rocks during traveling or clogs up by the splashing of muddy water occurs. With this, a problem that the regular function of the waterproof moisture-permeable film cannot be maintained over a long period of time newly arises.

Therefore, in such an electric drive device and an electric power steering device, it has been required to solve at least one of the above problems, and the present invention has been considered to meet such requirement.

An object of the present invention is to newly provide an electric drive device and an electric power steering device capable of suppressing the internal pressure fluctuation in the housing space for an electronic control unit and the penetration of water into the housing space for the electronic control unit over a long period of time.

Means for Solving the Problem(s)

In a feature of the present invention, on the opposite side to the output portion of the rotation shaft of an electric motor, a ventilation hole communicating between the housing space for an electronic control unit and the housing space for the electric motor is formed to an end surface portion of a motor housing which separates the housing space for the electronic control unit and the housing space for the electric motor, and a waterproof ventilation part which suppresses the passage of water and permits the passage of air and water vapor is provided to the ventilation hole.

EFFECT OF THE PRESENT INVENTION

According to the present invention, since the ventilation hole having the waterproof ventilation part is provided to the end surface portion of the motor housing, the influence of flying rocks and muddy water from the external environment can be eliminated, and the internal pressure fluctuation in the housing space for the electronic control unit and the penetration of water into the housing space can be suppressed over a long period of time.

MODE FOR IMPLEMENTING THE INVENTION

In the following, although embodiments of the present invention will be explained in detail by using drawings, the present invention is not limited to the following embodiments, and various variations and applications are included in a scope of a technical concept of the present invention.

Figure 1:
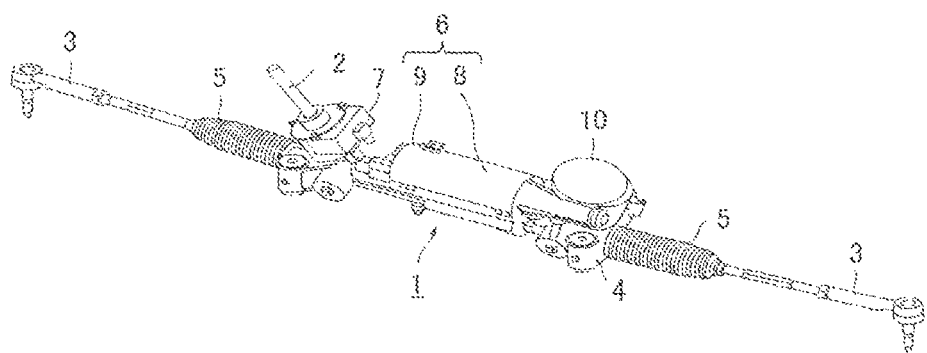
FIG. 1 is a perspective view of a whole steering apparatus as an example, to which the present invention is applied.

Before explaining an embodiment of the present invention, as an example to which the present invention is applied, the configuration of a steering apparatus will be simply explained by using FIG. 1.

First, a steering apparatus for steering front wheels of a vehicle will be explained. A steering apparatus 1 is configured as shown in FIG. 1. A pinion which is not shown in the drawings is provided to the lower end of a steering shaft 2 connected to a steering wheel which is not shown in the drawings. This pinion meshes with a long rack extending in the right and left direction of a vehicle body which is not shown in the drawings. Tie rods 3 for steering the front wheels in the right and left directions are connected to the respective both ends of the rack, and the rack is covered with a rack housing 4. In addition, rubber boots 5 are provided between the rack housing 4 and the tie rods 3.

An electric power steering device 6 is provided for assisting torque at the time when the turning operation of the steering wheel is performed. That is, a torque sensor 7 for detecting the rotation direction and the rotation torque of the steering shaft 2 is provided, and there are provided an electric motor section 8 for applying steering auxiliary force to the rack via a gear 10 based on the detected values of the torque sensor 7 and an electronic control section (ECU) 9 for controlling an electric motor disposed to the electric motor section 8. Three positions in the outer periphery on the output shaft side of the electric motor section 8 are connected to the gear 10 via bolts which are not shown in the drawings, and the electronic control section 9 is provided on the opposite side to the output shaft of the electric motor section 8.

In the electric power steering device 6, when the steering shaft 2 is operated and rotated in either direction by the operation of the steering wheel, the rotation direction and the rotation torque of the steering shaft 2 are detected by the torque sensor 7, and based on the detected values, a control circuit part calculates the driving operation quantity of the electric motor. The electric motor is driven by a power switching element of a power conversion circuit part based on the calculated driving operation quantity, and the output shaft of the electric motor drives the steering shaft 2 so as to be rotated in the same direction as an operation direction. The rotation of the output shaft is transmitted from the pinion not shown in the drawings to the rack not shown in the drawings via the gear 10, and the vehicle is steered. Such a configuration and action have already been known well, and further explanation is therefore omitted.

Figure 13:
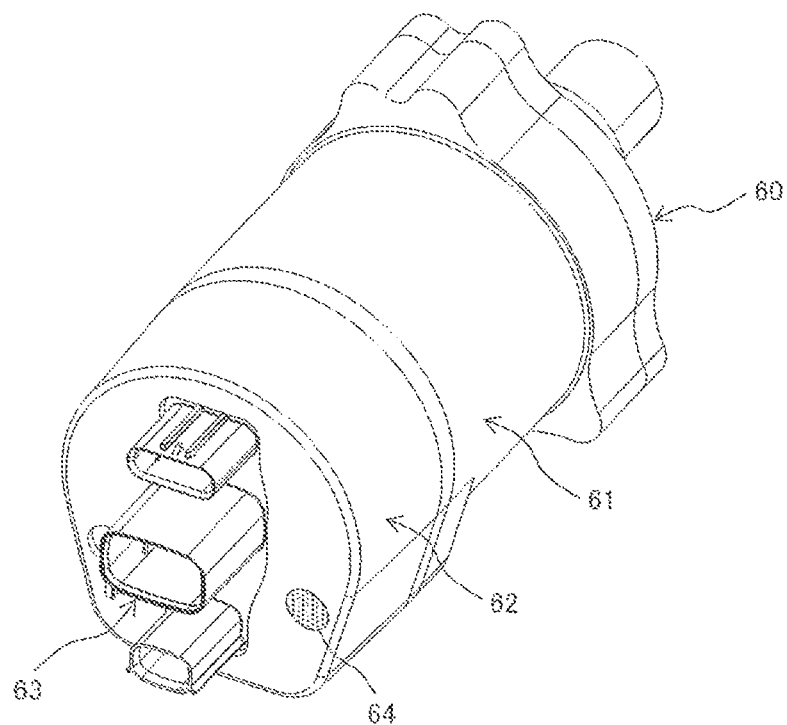
FIG. 13 is a perspective view of a whole conventional electric power steering device.

As described in the explanation of FIG. 13 of the conventional technique, in the configuration in which a ventilation hole is formed to a metal cover 62, and a waterproof moisture-permeable film 64 is disposed to the ventilation hole, there is a case where when an electric power steering device is mounted on a vehicle, the electric power steering device is mounted so as to be exposed to the external environment of the under part of the vehicle. Consequently, a phenomenon in which the waterproof moisture-permeable film 64 is broken by flying rocks during traveling or clogs up by the splashing of muddy water occurs. With this, a problem that the regular function of the waterproof moisture-permeable film 64 cannot be maintained over a long period of time newly arises.

EXAMPLE 1

In consideration of such a background, in a first embodiment of the present invention, an electric power steering device having the following configuration is proposed. That is, in the present embodiment, on the side opposite to the output portion of the rotation shaft of an electric motor, a ventilation hole is formed to an end surface portion of a motor housing which separates the housing space for an electronic control unit and the housing space for the electric motor, the ventilation hole communicating between the housing space for the electronic control unit and the housing space for the electric motor, and a waterproof ventilation part which suppresses the passage of water and permits the passage of air and water vapor is provided to the ventilation hole.

According to this configuration, since the ventilation hole having the waterproof ventilation part is provided to the end surface portion of the motor housing, the influence of flying rocks and muddy water from the external environment can be eliminated, and the internal pressure fluctuation in the housing space for the electronic control unit and the penetration of water into the housing space can be suppressed over a long period of time.

Figure 2:
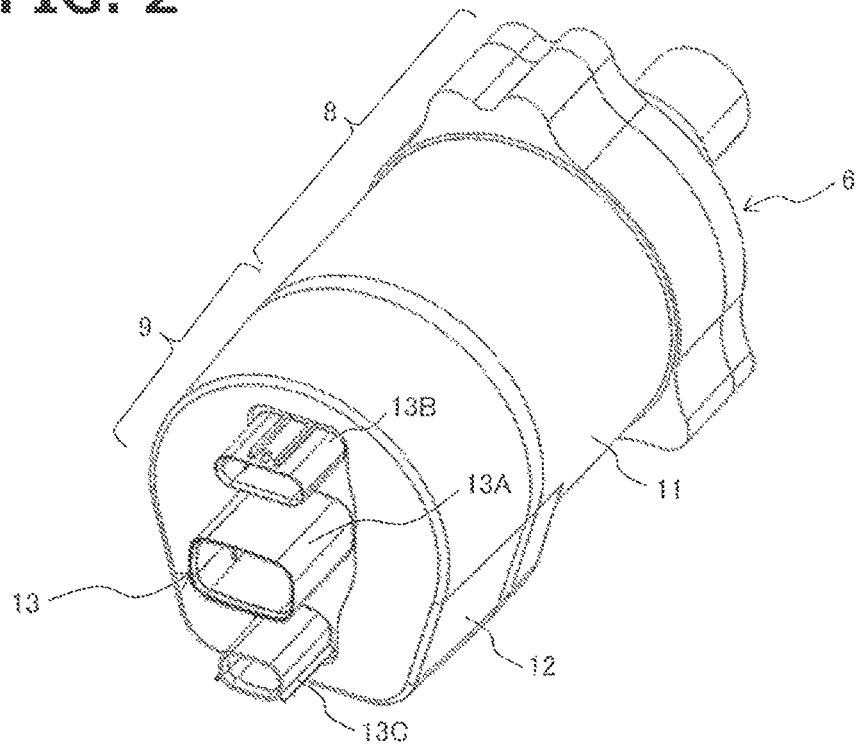
FIG. 2 is a perspective view of a whole electric power steering device which is a first embodiment of the present invention.
Figure 3:
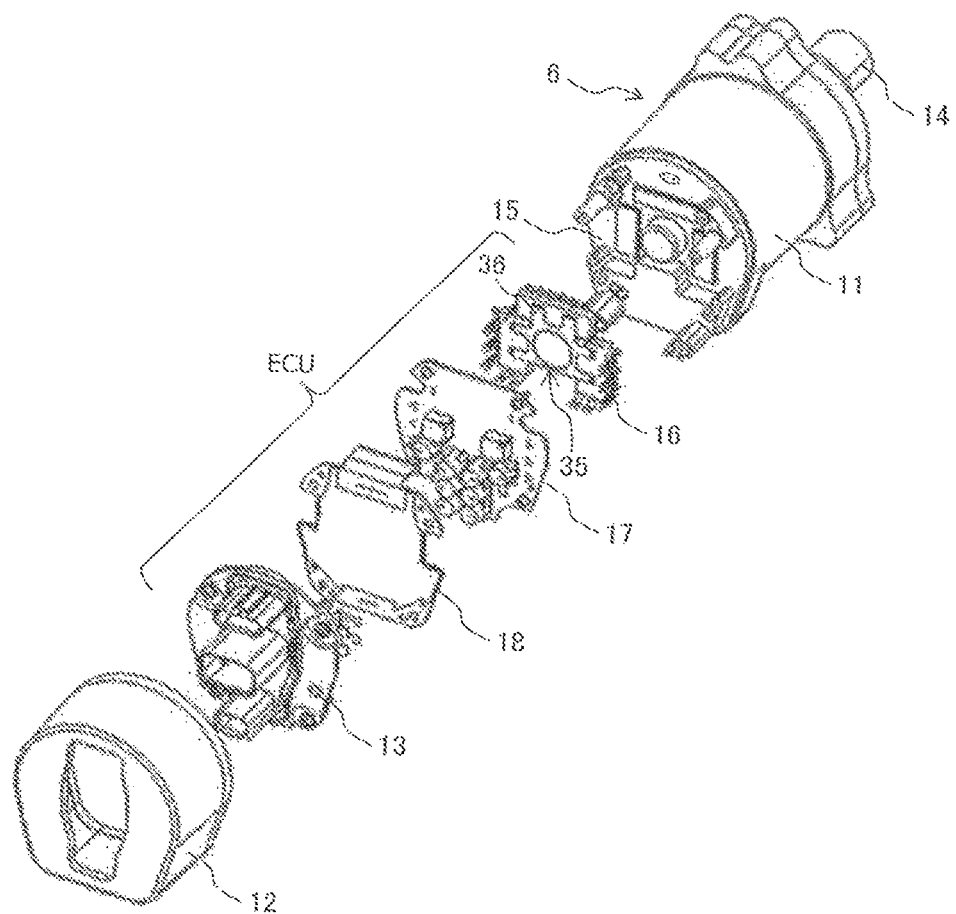
FIG. 3 is a perspective exploded view of the electric power steering device shown in FIG. 2.

In the following, a specific configuration of an electric power steering device which is the first embodiment of the present invention will be explained in detail, using FIG. 2 to FIG. 10. In addition, FIG. 2 is a drawing which shows a whole configuration of the electric power steering device which is a present embodiment. FIG. 3 is a drawing in which components of the electric power steering device shown in FIG. 2 are disassembled and then viewed in an oblique direction. FIG. 4 to FIG. 9 are drawings showing states in which each of the components is assembled according to the assembling order of the components. FIG. 10 is a drawing showing the configuration of the electric power steering device, which is the present embodiment, mounted on the steering apparatus. Therefore, in the following explanation, the explanation is described with reference to the drawings appropriately.

As shown in FIG. 2, an electric motor section 8 constituting the electric power steering device is composed of a motor housing 11 having a cylindrical part and made of, for example, aluminum alloy, and of an electric motor which is not shown in the drawings and which is accommodated in the motor housing 11. An electronic control section 9 is composed of a metal cover 12 which is disposed on the opposite side to the output shaft in the axial direction of the motor housing 11 and which is made of, for example, aluminum alloy, and of an electronic control unit which is not shown in FIG. 2 and which is accommodated in the metal cover 12.

The motor housing 11 and the metal cover 12 are integrally fixed to each other at their facing end surfaces by an adhesive, welding or a fixing bolt, The motor housing 11 forms a housing space for accommodating the electric motor. In addition, the metal cover 12 forms a housing space for accommodating thereinside the electronic control unit, and the electronic control unit accommodated in the housing space is composed of a power source circuit part for generating a required power source, a power conversion circuit having a power switching element for driving and controlling the electric motor in the electric motor section 8 which is formed by, for example, MOSFET or IGBT, and a control circuit part for controlling the power switching element. The output terminal of the power switching element is electrically connected to the input terminal of the electric motor via a bus bar.

A connector terminal assembly 13 is fixed to the end surface of the metal cover 12 by a fixing bolt. The connecter terminal assembly 13 is equipped with a connector terminal forming portion 13A for power supply, a connector terminal forming portion 13B for a detection sensor, and with a control-state-sending connector terminal forming portion 13C for sending a control state to an external device. Then, the electronic control unit accommodated in the metal cover 12 is supplied with power from a power source via the connector terminal forming portion 13A for power supply which is made of synthetic resin. In addition, the electronic control unit is supplied with detected signals of a driving condition and the like from various detection sensors via the detection-sensor connector terminal forming portion 13B, and a signal of the present control state of the electric power steering device is sent via the connector terminal forming portion 130 for sending a control state.

FIG. 3 shows a perspective exploded view of the electric power steering device 6. An annular side yoke (now shown in the drawings) made of iron is fitted to the inside of the motor housing 11, and the electric motor (not shown in the drawings) is accommodated in the side yoke. An output portion 14 of the electric motor applies steering assist force to a rack via a gear. In addition, the specific configuration of the electric motor has been known well, and its explanation is therefore omitted.

The motor housing 11 is made of aluminum alloy, and functions as a heat sink member for radiating, to the external atmosphere, the heat generated at the electric motor and the heat generated at the after-mentioned power source circuit part and power conversion circuit part. The electric motor section is composed of the electric motor and the motor housing 11.

The electronic control unit ECU is attached to an end surface portion 15 of the motor housing 11 which is positioned on the opposite side to the output portion 14 of the electric motor section, so as to be adjacent thereto. The electronic control unit ECU is composed of a power conversion circuit part 16, a power source circuit part 17 and a control circuit part 18. Although the end surface portion 15 of the motor housing 11 is formed integrally with the motor housing 11, in addition to this, the end surface portion 15 may be separately formed, and then is integrated with the motor housing 11 with a screw or by welding.

Here, the power conversion circuit part 16, the power source circuit part 17 and the control circuit part 18 constitute redundancy systems, and each constitute a double system of a main electronic control part and an auxiliary electronic control part. Normally, the electric motor is controlled and driven by the main electronic control part. However, when abnormalities or failures occur to the main electronic control part, it is switched to the auxiliary electronic control part, and the electric motor is controlled and driven.

Therefore, as mentioned below, normally, when the heat from the main electronic control part is transferred to the motor housing 11, and abnormalities or failures occur to the main electronic control part, the main electronic control part is stopped, the auxiliary electronic control part is operated, and then the heat from the auxiliary electronic control part is transferred to the motor housing 11.

In addition, different from the redundant system, the main electronic control part and the auxiliary electronic control part can be united so as to function as a normal electronic control part, such that when abnormalities or failures occur to one of the electronic control parts, the electric motor can be controlled and driven by the other of the electronic control parts by a half capacity. In this case, although the capacity of the electronic motor becomes half, a power steering function is ensured. Therefore, in a normal case, the heat from the main electronic control part and the heat from the auxiliary electronic control part are transferred to the motor housing 11.

The electronic control unit ECU is composed of the control circuit part 18, the power source circuit part 17, the power conversion circuit part 16, and the connector terminal assembly 13, and the power conversion circuit part 16, the power source circuit part 17, the control circuit part 18 and the connector terminal assembly 13 are arranged in this order in a direction away from the end surface portion 15. The control circuit part 18 is one for generating a control signal for driving a switching element of the power conversion circuit part 16, and is composed of a microcomputer, a peripheral circuit and the like. The power source circuit part 17 is one for generating the power source for driving the control circuit part 18 and the power source for the power conversion circuit part 16, and is composed of a capacitor, a coil, a switching element and the like. The power conversion circuit part 16 is one for adjusting power which flows the coil of the electric motor, and is composed of a three-phase switching element forming upper and lower arms.

In the electronic control unit ECU, mainly, the heat value of the power conversion circuit part 16 and the power source circuit part 17 is large, and the heat of the power conversion circuit part 16 and the power source circuit part 17 is radiated from the motor housing 11 made of aluminum alloy. In addition, in the present embodiment, a resilient functional member 36 and a lid member 35 are attached to the end surface portion of the motor housing 11 on the end portion side of the rotation shaft of the electric motor. By the resilient functional member 36 formed in the lid member 35, the power conversion circuit part 16 is pushed. toward the heat radiation portions formed on the end surface of the motor housing 11, such that the power conversion circuit part 16 is pushed and held to the heat radiation portions.

The connector terminal assembly 13 made of synthetic resin is provided between the control circuit part 18 and the metal cover 12, and is connected to other external control devices which are not shown in the drawings so as to send the present control states of a battery (power source) for a vehicle and the electric power steering device. Of course, it goes without saying that the connector terminal assembly 13 is connected to the power conversion circuit part 16, the power source circuit part 17 and the control circuit part 18.

The metal cover 12 has a function for accommodating the power conversion circuit part 16, the power source circuit part 17 and the control circuit part 18 so as to water-tightly seal them. In the present embodiment, the metal cover 12 is bonded and fixed to the motor housing 11 with a liquid gasket. This liquid gasket is a substance having fluidity at room temperature in general. The liquid gasket is applied to the bonded surface, and dries or becomes uniform after the lapse of a predetermined time, so as to form an elastic coating film or a film having adhesiveness. Therefore, it maintains the water-tightness of the bonded part and has a pressure resisting function. In addition, the metal cover 12 is made of metal, and also has a function for radiating, to the outside, the heat generated in the power conversion circuit part 16 and the power source circuit part 17.

Figure 4:
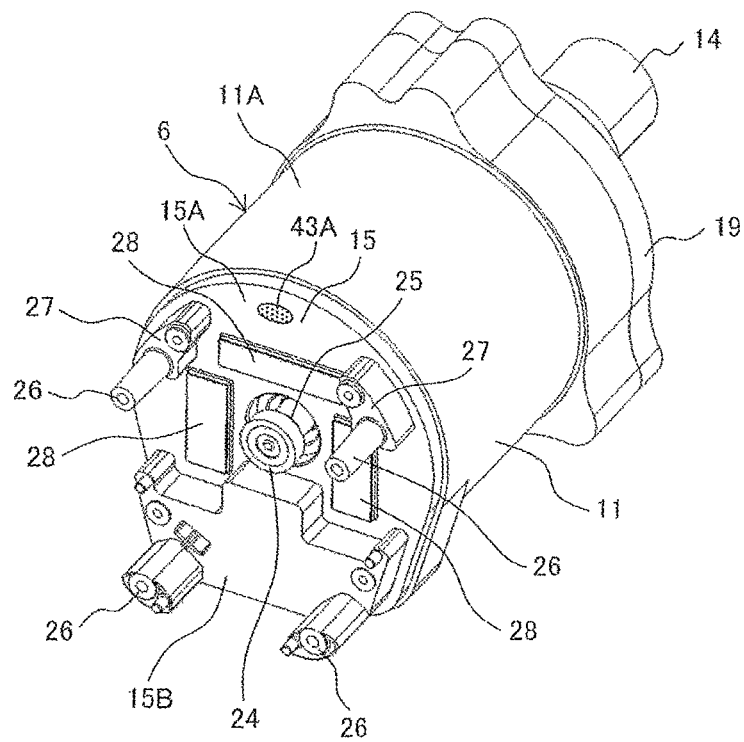
FIG. 4 is a perspective view of a motor housing shown in FIG. 3.
Figure 5:
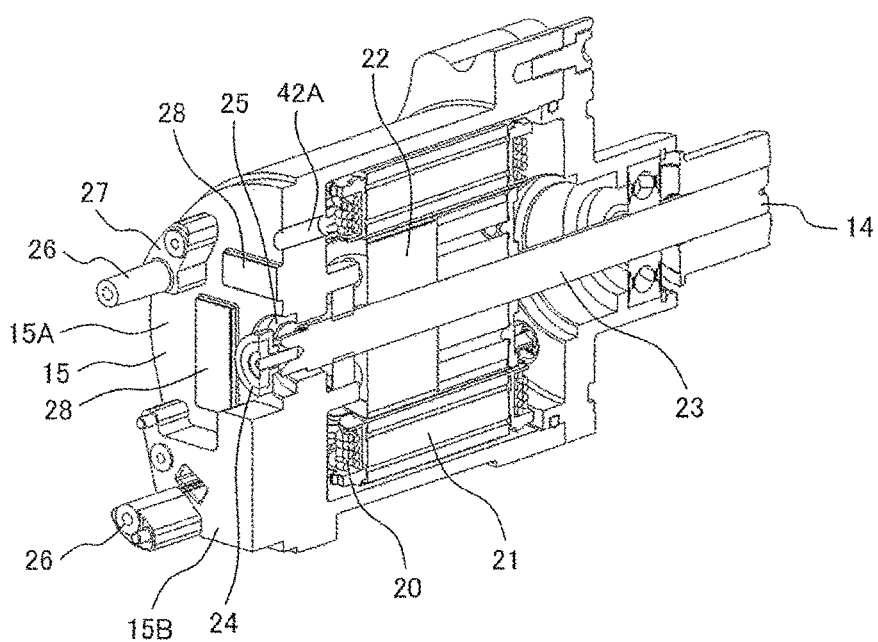
FIG. 5 is a sectional view of the motor housing shown in FIG. 4 which is taken along the axial direction.

Next, the configuration and the assembling method of each component will be explained based on FIG. 4 to FIG. 9. First, FIG. 4 shows the appearance of the motor housing 11, and FIG. 5 shows its cross section in the axial direction. In FIG. 4 and FIG. 5, the motor housing 11 is formed in a cylindrical shape and is composed of an outer peripheral surface portion 11A, an end surface portion 15 closing one end of the outer peripheral surface portion 11A, and an end surface portion 19 closing the other end of the outer peripheral surface portion 11A. In the present embodiment, the motor housing 11 has a cylindrical shape with a bottom, and the outer peripheral surface portion 11A is formed integrally with the end surface portion 15. In addition, the end surface portion 19 functions as a lid, so as to close the other end of the outer peripheral surface portion 11A, after the electric motor is accommodated in the outer peripheral surface portion 11A.

As shown in FIG. 5, a stator 21 in which a coil 20 is wound around the iron core is fitted to the inside of the outer peripheral surface portion 11A, and a rotor 22 having a permanent magnet embedded therein is rotatably accommodated in the stator 21. A rotation shaft 23 is fixed to the rotor 22, and one end of the rotation shaft 23 is an output portion 14 and the other end is a rotation detection part 24 for detecting the rotation phase and the rotation speed of the rotation shaft 23. A permanent magnet is provided to the rotation detection part 24, and the rotation detection part 24 protrudes outward so as to pass through a through hole 25 provided to the end surface portion 15. Then, by a magnetism sensing portion composed of, for example, a GLAIR element which is not shown in the drawings, the rotation phase and the rotation speed of the rotation shaft 23 are detected.

Turning back to FIG. 4, a heat radiation region 15A of the power conversion circuit part 16 and a heat radiation region 15B of the power source circuit part 17 are formed on the surface of the end surface portion 15 positioned on the opposite side to the output portion 14 of the rotation shaft 23. A board fixing projection portion 26 is integrally planted to each of the four corners of the end surface portion 15, and is formed with, inside thereof, a screw hole. The board fixing projection portion 26 is provided to fix the after-mentioned board of the control circuit part 18. In addition, a board receiving portion 27 having the same height in the axial direction as the after-mentioned power source heat radiation region 15B is formed to the board fixing projection portion 26. The board receiving portion 27 is one for mounting the after-mentioned glass epoxy board 31 of the power source circuit part 17. A plane region in the radial direction orthogonal to the rotation shaft 23 which forms the end surface portion 15 is divided into two regions. One of the two regions forms the power conversion heat radiation region 15A to which the power conversion circuit part 16 is attached, and the other forms the power source heat radiation region 15B to which the power source circuit part 17 is attached. In the present embodiment, the area of the power conversion heat radiation region 15A is larger than that of the power source heat radiation region 15B, in order to ensure the installation area of the power conversion circuit part 16, because, as mentioned above, a double system is adopted.

The power conversion heat radiation region 15A and the power source heat radiation region 15B have level differences having different heights in the axial direction (direction in which the rotation shaft 23 extends). That is, the power source heat radiation region 15B is formed to have a level difference in a direction away from the power conversion heat radiation region 15A when viewed in the direction of the rotation shaft 23 of the electric motor. This level difference is set to have a length in which the power conversion circuit part 16 and the power source circuit part 17 do not interfere with each other when the power source circuit part 17 is disposed after the power conversion circuit part 16 is disposed.

Three long and narrow rectangular protruding heat radiation portions 28 are formed in the power conversion heat radiation region 15A. The after-mentioned double-system power conversion circuit part 16 is disposed on the protruding heat radiation portions 28. In addition, each of the protruding heat radiation portions 28 protrudes in a direction away from the electric motor when viewed in the direction of the rotation shaft 23 of the electric motor.

In addition, the power source heat radiation region 15B has a plane shape, and the after-mentioned power source circuit part 17 is disposed thereon. Therefore, the protruding heat radiation portions 28 each function as a heat radiation portion for transferring the heat generated in the power conversion circuit part 16 to the end surface portion 15, and the power source heat radiation region 15B functions as a heat radiation portion for transferring the heat generated in the power source circuit part 17 to the end surface portion 15. In addition, the protruding heat radiation portions 28 can be omitted, and in this case, the power conversion heat radiation region 15A functions as a hear radiation portion for transferring the heat generated in the power conversion circuit part 16 to the end surface portion 15.

In this way, in the end surface portion 15 of the motor housing 11 which becomes the present embodiment, a heat sink member is omitted, and a length in the axial direction can be shortened. In addition, since the motor hosing 11 has a sufficient heat capacity, the heat of the power source circuit part 17 and the power conversion circuit part 16 can be efficiently radiated to the outside.

Moreover, as shown in FIG. 5, a ventilation hole 42 fluidally connecting the housing space which is formed by the motor housing 11 and which accommodates the electric motor and the housing space which is formed by the metal cover 12 and which accommodates the power conversion circuit part 16, the power source circuit part 17 and the control circuit part 18 is formed in the power conversion heat radiation region 15A of the end surface portion 15. In addition, as shown in FIG. 4, the ventilation hole 42 is provided with a waterproof ventilation part 43 which suppresses the passage of water and permits the passage of air and water vapor. The details of the ventilation hole 42 and the waterproof ventilation part 43 will be explained in FIG. 10.

Figure 6:
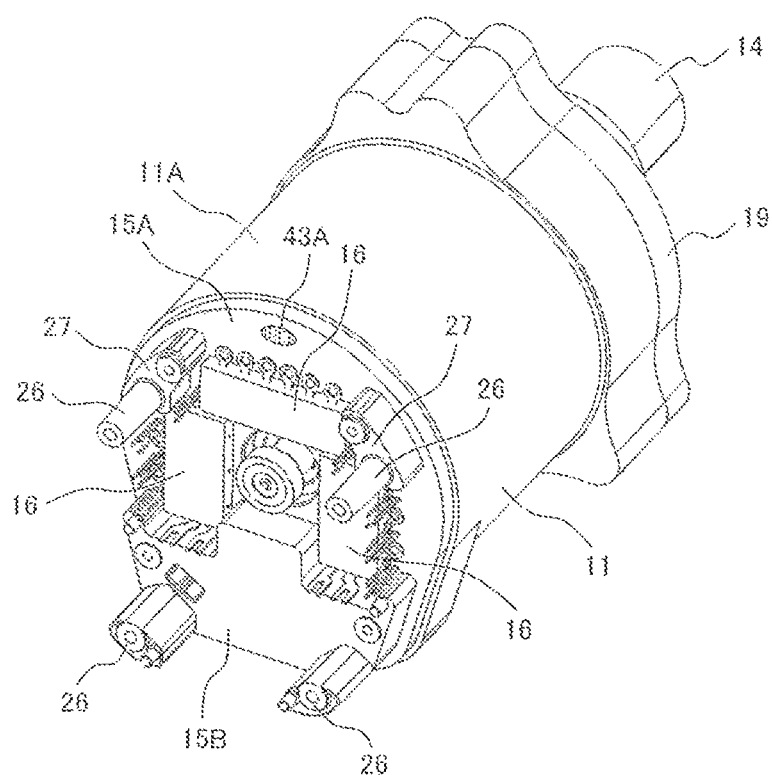
FIG. 6 is a perspective view showing a state in which a power conversion circuit part is mounted on the motor housing shown in FIG, 4.

Next, FIG. 6 shows a state in which the power conversion circuit part 16 is disposed on the protruding heat radiation portions 28. As shown in FIG. 6, the power conversion circuit part 16 constituted in a double-system is disposed on the protruding heat radiation portions 28 formed in the power conversion heat radiation region 15A. Switching elements composing the power conversion circuit part 16 are mounted on respective metal boards (here, aluminum-based metal is used), so as to radiate heat easily, and then it is packaged by synthetic resin, including the switching elements and the metal boards on the switching element side.

Accordingly, the metal boards of the power conversion circuit part 16 are thermally connected to the respective protruding heat radiation portions 28. Consequently, the heat generated in the switching elements can be efficiently transferred to the protruding heat radiation portions 28. Heat conductive grease is applied between the metal boards of the power conversion circuit part 16 and the protruding heat radiation portions 28, so as to transfer the heat of the power conversion circuit part 16 to the protruding heat radiation portions 28 easily. In addition, also as shown in FIG. 3, the power conversion circuit part 16 is pushed to and held on the protruding heat radiation portion 28 side by the resilient functional member 36 of the lid member 35 attached to the end portion of the rotation shaft 23.

The heat transferred to the protruding heat radiation portions 28 is diffused to the power conversion heat radiation region 15A, is transferred to the outer peripheral surface portion 11A of the motor housing 11, and then is radiated to the outside. Here, as mentioned above, since the height in the axial direction of the power conversion circuit part 16 is lower than that of the power source heat radiation region 15B, it does not interfere with the after-mentioned power source circuit part 17.

Figure 7:
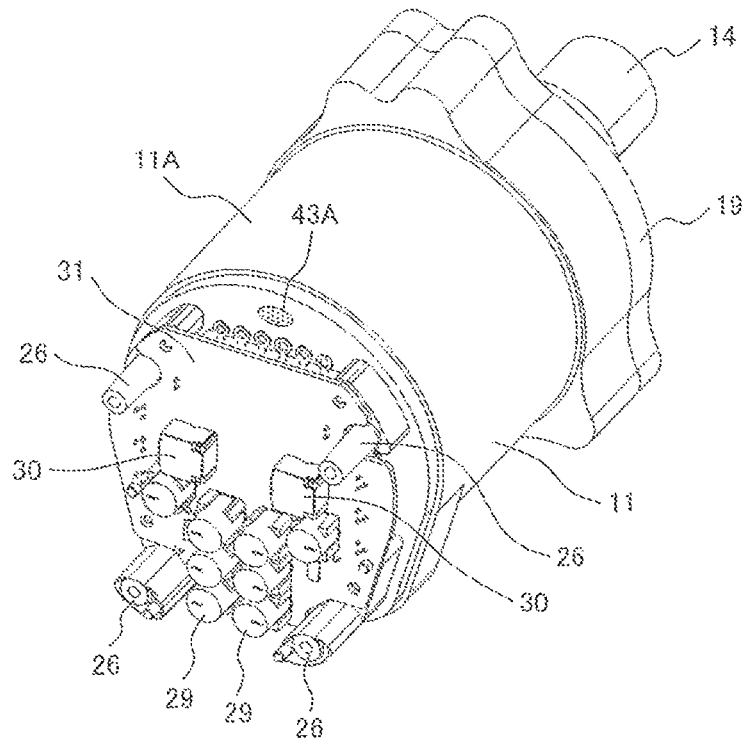
FIG. 7 is a perspective view showing a state in which a power source circuit part is mounted on the motor housing shown in FIG. 4.

Next, FIG. 7 shows a state in which the power source circuit part 17 is disposed over the power conversion circuit part 16. As shown in FIG. 7, the power source circuit part 17 is disposed on the power source heat radiation region 15B. Capacitors 29 and coils 30 composing the power source circuit part 17 are mounted on the glass epoxy board 31. The power source circuit part 17 also adopts a double system, and as is clear from FIG. 7, power source circuits composed of the capacitors 29 and the coils 30 are symmetrically formed.

The surface on the power source heat radiation region 15B side of the glass epoxy board 31 is fixed to the end surface portion 15 so as to come in contact with the power source heat radiation region 15B. In a method for the fixing, as shown in FIG. 7, the glass epoxy board 31 is fixed to screw holes provided to the board receiving portions 27 of the board-connector fixing projection portions 26 with fixing bolts which are not shown in the drawings. In addition, it is fixed to screw holes provided to the power source heat radiation region 15B with fixing bolts which are not shown in the drawings.

In addition, since the power source circuit part 17 is formed by the glass epoxy board 31, double-side mounting becomes possible. Then, GMR elements, which are not shown in the drawings, and a rotation phase detection part and a rotation speed detection part composed of detection circuits of the GMR elements are mounted on the surface on the power source heat radiation region 15B side of the glass epoxy board 31 so as to detect the rotation phase and the rotation speed of the rotation shaft 23, in cooperation with the rotation detection part 24 provided to the rotation shaft 23.

In this way, since the glass epoxy board 31 is fixed so as to come in contact with the power source heat radiation region 15B, the heat generated in the power source circuit part 17 can be efficiently transferred to the power source heat radiation region 15B. The heat transferred to the power source heat radiation region 15B is transferred and diffused to the outer peripheral surface portion 11A of the motor housing 11, and is radiated to the outside. Here, one of adhesive having well heat transfer, heat radiating grease and a heat radiating sheet can be interposed between the glass epoxy board 31 and the power source heat radiation region 15B, and thereby heat transfer performance can be further improved.

Figure 8:
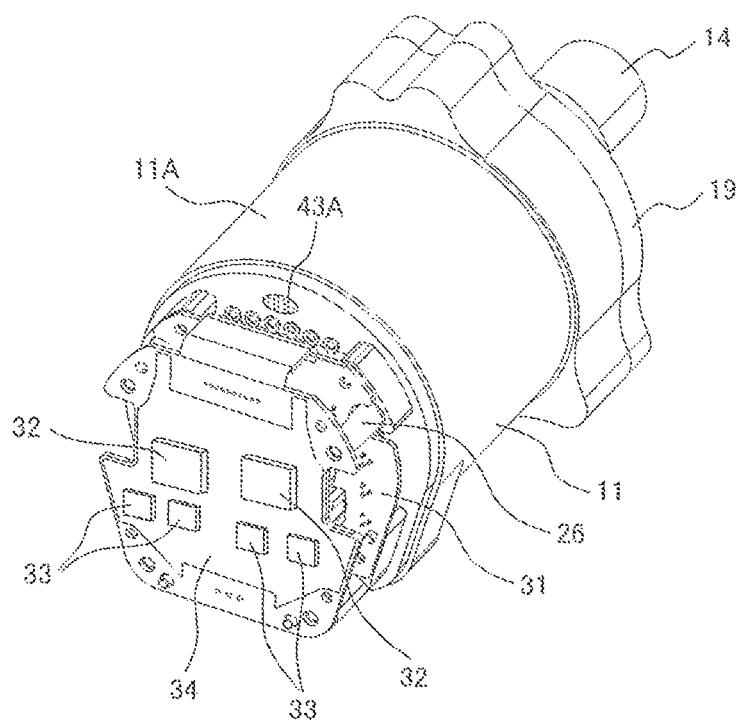
FIG. 8 is a perspective view showing a state in which a control circuit part is mounted on the motor housing shown in FIG. 4.

Next, FIG. 8 shows a state in which the control circuit part 18 is disposed over the power source circuit part 17. As shown in FIG. 8, the control circuit part 18 is disposed above the power source circuit part 17. Microcomputers 32 and peripheral circuits 33 composing the control circuit part 18 are mounted on a glass epoxy board 34. A double system is also adopted to the control circuit part 18, and, as is clear from FIG. 8, control circuits constituted of the microcomputers 32 and the peripheral circuits 33 are symmetrically formed. In addition, the microcomputers 32 and the peripheral circuits 33 may be provided to the surface on the power source circuit part 17 side of the glass epoxy board 34.

As shown in FIG. 8, the glass epoxy board 34 is fixed to bolt holes provided to the top portions of the board fixing projection portions 26 with fixing bolts which are not shown in the drawings, and the space between the glass epoxy board 31 of the power source circuit part 17 and the glass epoxy board 34 of the control circuit part 18 serves as a space in which the capacitors 29 and the coils 30 of the power source circuit part 17 shown in FIG. 7 are disposed.

According to the present embodiment, the power conversion circuit part 16 is disposed on the protruding heat radiation portions 28 formed in the power conversion heat radiation region 15A. Consequently, the heat generated in the switching elements of the power conversion circuit part 16 can be efficiently transferred to the protruding heat radiation portions 28. Moreover, the heat transferred to the protruding heat radiation portions 28 is diffused to the power conversion heat radiation region 15A, is transferred to the outer peripheral surface portion 11A of the motor housing 11, and then is radiated to the outside.

Similarly, the power source circuit part 17 is disposed on the power source heat radiation region 15B. The surface on the power source heat radiation region 15B side of the glass epoxy board 31 on which circuit elements of the power source circuit part 17 are mounted is fixed to the end surface portion 15 so as to come in contact with the power source heat radiation region 15B. Therefore, the heat generated in the power source circuit part 17 can be efficiently transferred to the power source heat radiation region 15B. The heat transferred to the power source heat radiation region 15B is transferred and diffused to the outer peripheral surface portion 11A of the motor housing 11, and is radiated to the outside.

According to such a configuration, at least the heat generated in the power source circuit part 17 and the power conversion circuit part 16 is transferred to the end surface portion 15 of the motor housing 11, and thereby the length in the axial direction can be shortened by omitting a heat sink member. In addition, since the motor hosing 11 has a sufficient heat capacity, the heat of the power source circuit part 17 and the power conversion circuit part 16 can be efficiently radiated to the outside.

Figure 9:
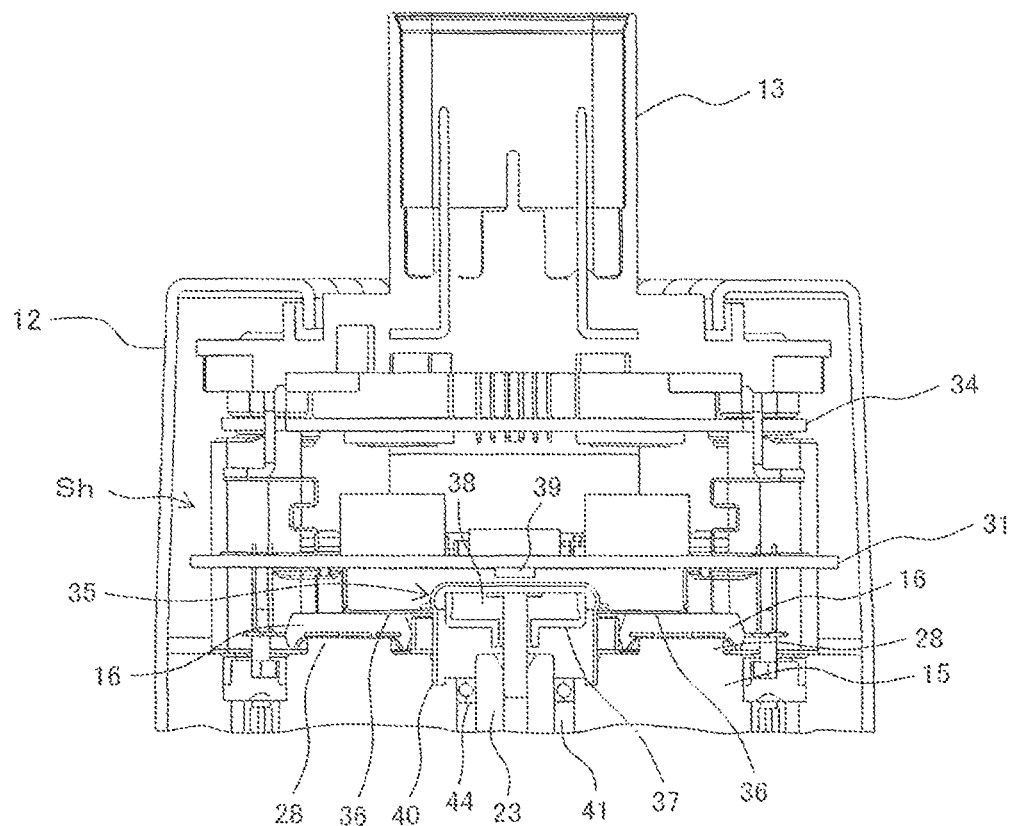
FIG. 9 is a sectional view taken by sectioning the vicinity of an electronic control unit of the assembled electronic power steering device in the axial direction.
Figure 10:
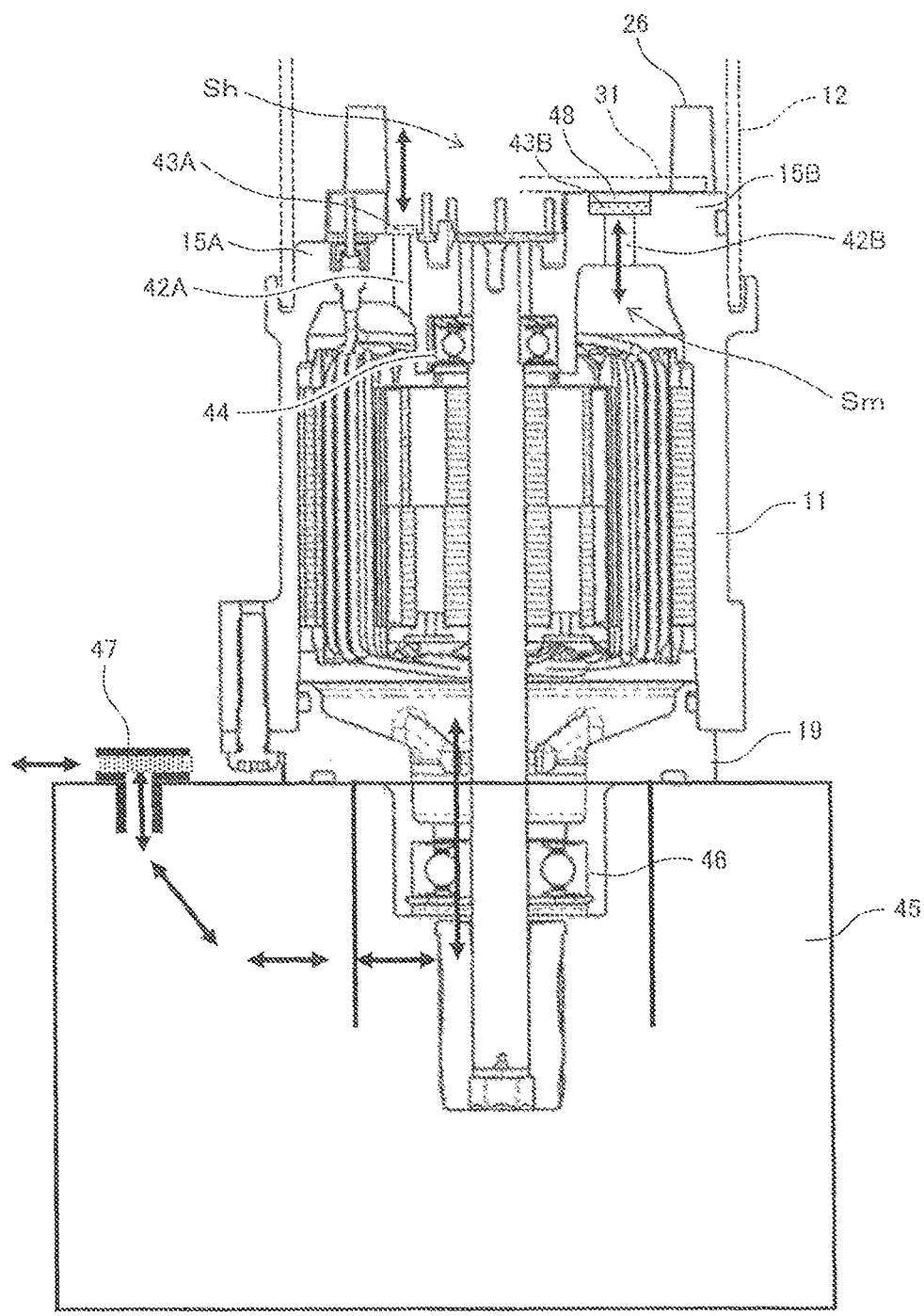
FIG. 10 is a sectional view for explaining a state in which the electric power steering device which is the first embodiment of the present invention is attached to the steering apparatus. In addition, the electronic control unit is omitted.

Next, in FIG. 9, the electronic control unit ECU is disposed so as to be adjacent to the end surface portion 15 of the motor housing 11, and by being covered with the metal cover 12, the electronic control unit ECU is accommodated in a housing space Sh formed by the metal cover 12 and the end surface portion 15. In addition, the electric motor is accommodated in a housing space Sm (see FIG. 10) of the motor housing 11.

Then, a magnet holding part 37 is fixed to the end portion on the opposite side to the output portion 14 of the rotation shaft 23, and a permanent magnet (sensor magnet) 38 composing the rotation detection part 24 is accommodated in and fixed to the magnet holding part 37. The end portion of the rotation shaft 23, the magnet holding part 37 and the permanent magnet 38 extend toward the electronic control unit ECU so as to pass through the end surface portion 15 of the motor housing 11. A magnetic sensor 39 having a magnetic sensing function, such as a GMR element, is fixed to the surface on the motor housing 11 side of the glass epoxy board 31 of the power source circuit part 17 which is arranged on the electronic control unit ECU side, and by the rotation of the permanent magnet 38, the rotation phase and the like of the rotation shaft 23 are detected.

The lid member 35 is fixed on the outer peripheral side of the magnet holding part 37 and the permanent magnet 38 so as to be spaced from each other. As shown in FIG. 9, the lid member 35 is formed in a circular hollow shape with a bottom (so-called cup shape) which includes a hollow wall surface portion and a bottom surface wall portion. Then, the lid member 35 is firmly fixed to a fixing hole 40 formed to the end surface portion 15 with a fixing method, such as press fitting and bonding, so as to cover the outer peripheral surfaces of the permanent magnet 38 and the magnet holding part 37.

The fixing hole 40 is formed, so as to have a circular shape, on the outer periphery of a through hole 41 which is formed in the vicinity of the center of the end surface portion 15 and through which the rotation shaft 23 passes, and the outer peripheral surface forming the hollow portion of the lid member 35 is press-fitted to the inner periphery of the fixing hole 40 or fixed thereto with a fixing method, such as bonding. A ball bearing 44 is interposed to the through hole 41, and the rotation shaft 23 is rotatably and pivotally supported on the ball bearing 44. Therefore, basically, the housing space Sm of the motor housing 11 is water-tightly separated from the housing space Sh formed inside the metal cover 12 by the end surface portion 15 and the lid member 35.

In addition, in the present embodiment, although the lid member 35 is formed to cover the magnet holding part 37 and the permanent magnet 38, in a case where the magnet holding part 37 and the permanent magnet 38 are not provided, the lid member 35 may water-tightly cover the end portions of the through hole 41 and the rotation shaft 23.

Then, as mentioned in the section of "problem(s) to be solved by the invention", it is necessary to ensure air permeability of the housing space Sh for the electronic control unit ECU which is formed by the metal cover 12 to suppress the internal pressure fluctuation of the housing space which is caused by temperature fluctuation. Therefore, although the configuration in which a ventilation hole is formed to the metal cover 12 which accommodates the electronic control unit ECU and a waterproof moisture-permeable film is disposed to the ventilation hole has been proposed, there is a case where when the electric power steering device is mounted on a vehicle, the electric power steering device is mounted so as to be exposed to the external environment of the under part of the vehicle. Consequently, a phenomenon in which the waterproof moisture-permeable film is broken by flying rocks during traveling or clogs up by the splashing of muddy water occurs. With this, a problem that the regular function of the waterproof moisture-permeable film cannot be maintained over a long period of time arises.

Therefore, according to the present embodiment, as shown in FIG. 10, a ventilation hole 42A is formed to a part of the power conversion heat radiation region 15A of the end surface portion 15 which separates the housing space Sm of the motor housing 11, which accommodates the electric motor, from the housing space Sh of the metal cover 12 which accommodates the electronic control unit ECU, and a waterproof moisture-permeable film 43A that is a waterproof ventilation functional member is disposed to the ventilation hole 42A on the housing space Sh side of the metal cover 12.

The waterproof moisture-permeable film 43A is a waterproof moisture-permeable film having both waterproof function and air permeable (moisture permeable) function in which the passage of air and water vapor is permitted and the passage of water is suppressed. This waterproof moisture-permeable film can be made by combining, for example, polyurethane polymer and a film obtained by the stretching process of polytetrafluoroethylene, and it is a wall-known functional member.

Therefore, the housing space Sm of the motor housing 11 is fluidly connected to the housing space Sh of the metal cover 12 via the waterproof moisture-permeable film 43A and the ventilation hole 42A formed in the power conversion heat radiation region 15A of the end surface portion 15. Consequently, by the waterproof moisture-permeable film 43A provided to the ventilation hole 42A, the ventilation between the housing space Sm of the motor housing 11 and the housing space Sh of the metal cover 12 can be ensured, and a phenomenon in which water which has entered into the inside of the motor housing 11 also enters on the electronic control unit ECU side can be avoided.

In this way, since the ventilation hole 42A and the waterproof moisture-permeable film 43A are provided to the end surface portion 15 of the motor housing 11, they are not exposed to the external environmental by being covered with the metal cover 12. Therefore, the occurrence of a phenomenon in which the waterproof moisture-permeable film 43A is broken by flying rocks during traveling or clogs up by the splashing of muddy water can be avoided, and the regular function of the waterproof moisture-permeable film 43A can be maintained over a long period of time.

In addition, in the present embodiment, in a state in which the electric power steering device 6 is attached to a gear box 45 of the steering apparatus, the housing space Sh of the metal cover 12 and the housing space Sm of the motor housing 11 extend, through a ball bearing 46 on the output shaft 14 side, to a waterproof moisture-permeable film 47 on the gearbox side via a passage (not shown) formed in the bear box 45. In this configuration, water penetration can be further suppressed.

Here, since a non-contact metal seal is adopted to at least the ball bearing 46, air permeability is higher than one adopting a contact type rubber seal, and the ventilation between the housing space Sm of the motor housing 11 and the housing space Sh of the metal cover 12 can be facilitated.

In addition, the waterproof moisture-permeable film 43A provided in the power conversion heat radiation region 15A of the end surface portion 15 is fixed with a fixing method, such as a snap fit method, a sticking method and a welding method. In the present embodiment, the waterproof moisture-permeable film 43A is stuck to the surface of the power conversion heat radiation region 15A with a sticking method.

In addition, in the present embodiment, the waterproof moisture-permeable film 43A is attached to the surface on the metal cover 12 side of the power conversion heat radiation region 15A. With this, by the waterproof moisture-permeable film 43A, water and the like are not enter on the metal case side, and an attachment part of the waterproof moisture-permeable film 43A to the power conversion heat radiation region 15A can be suppressed from receiving the influence of water.

On the other hand, as another example of the present embodiment, the waterproof moisture-permeable film 43A can be attached to the surface on the housing space Sm side of the motor housing 11 in the power conversion heat radiation region 15A. In this case, when the motor housing 11 and the electronic control unit ECU are assembled, a possibility that the waterproof moisture-permeable film 43A is broken by carelessly touching the waterproof moisture-permeable film 43A can be reduced, because the waterproof moisture-permeable film 43A is attached on the motor housing 11 side.

In the embodiment explained above, although the ventilation hole 42A and the waterproof moisture-permeable film 43A are provided in the power conversion heat radiation region 15A of the end surface portion 15, they can be provided in the power source heat radiation region 15B of the end surface portion 15. Similarly, as shown in FIG. 10, a ventilation hole 42B is formed in the power source heat radiation region 15B of the end surface portion 15.

The surface of the ventilation hole 42B which positioned on the metal cover 12 side of the power source heat radiation region 15B is formed with a communication groove 48 communicated to the housing space of the metal cover 12. That is, since the glass epoxy board 31 of the power source circuit part 17 is mounted on the power source heat radiation region 15B, there is a possibility that ventilation is inhibited. To avoid this possibility, the communication groove 48 is formed, and the waterproof moisture-permeable film 43B is disposed on the merging part of the communication groove 48 and the ventilation hole 42B. In addition, it goes without saying that the waterproof moisture-permeable film 43B can be attached to the surface on the motor housing 11 side in the power source heat radiation region 15B.

In addition, in the present embodiment, since the ventilation hole 42A or the ventilation hole 42B is formed to the end surface portion 15 in the vicinity of the power conversion circuit part 16 and the power source circuit part 17 each having a high heat value, high-temperature air can be also moved efficiently, and in view of heat radiation, it is an advantageous configuration.

As mentioned above, in the present embodiment, since the housing space of the motor housing is fluidly connected to the housing space of the metal cover via the waterproof moisture-permeable film and the ventilation hole formed to the end surface portion of the motor housing, by the waterproof moisture-permeable film provided to the ventilation hole, the ventilation between the housing space of the motor housing and the housing space of the metal cover can be ensured, and a phenomenon in which water which has entered into the inside of the motor housing also enters on the electronic control unit ECU side can be avoided.

In addition, since the ventilation hole and the waterproof moisture-permeable film are provided to the end surface portion of the motor housing so as to be covered with the metal cover, they are not exposed to the external environmental. Consequently, a phenomenon in which the waterproof moisture-permeable film is broken by flying rocks during traveling or clogs up by the splashing of muddy water can be avoided, and thereby the regular function of the waterproof moisture-permeable film can be maintained over a long period of time.

In addition, as mentioned above, the waterproof moisture-permeable film can be provided to the housing space (motor side) Sm of the motor housing 11. According to this configuration, water which has entered from the motor side is not accumulated in a recessed portion formed on the end surface portion 15, and thereby the durability of the ventilation hole 42A can be improved.

EXAMPLE 2

Next, a second embodiment of the present invention will be explained. Although, in the first embodiment, the ventilation hole 42A or the ventilation hole 42B is formed on the wall surface of the end surface portion 15 (specifically, in the power conversion heat radiation region 15A or the power source heat radiation region 15B), in the second embodiment, the ventilation hole is formed to the board fixing projection portion for the attachment of the glass epoxy board of the power source circuit part and the glass epoxy board of the control circuit part. In addition, since the same symbols as the first embodiment are applied to the same components, their explanation is omitted.

Figure 11:
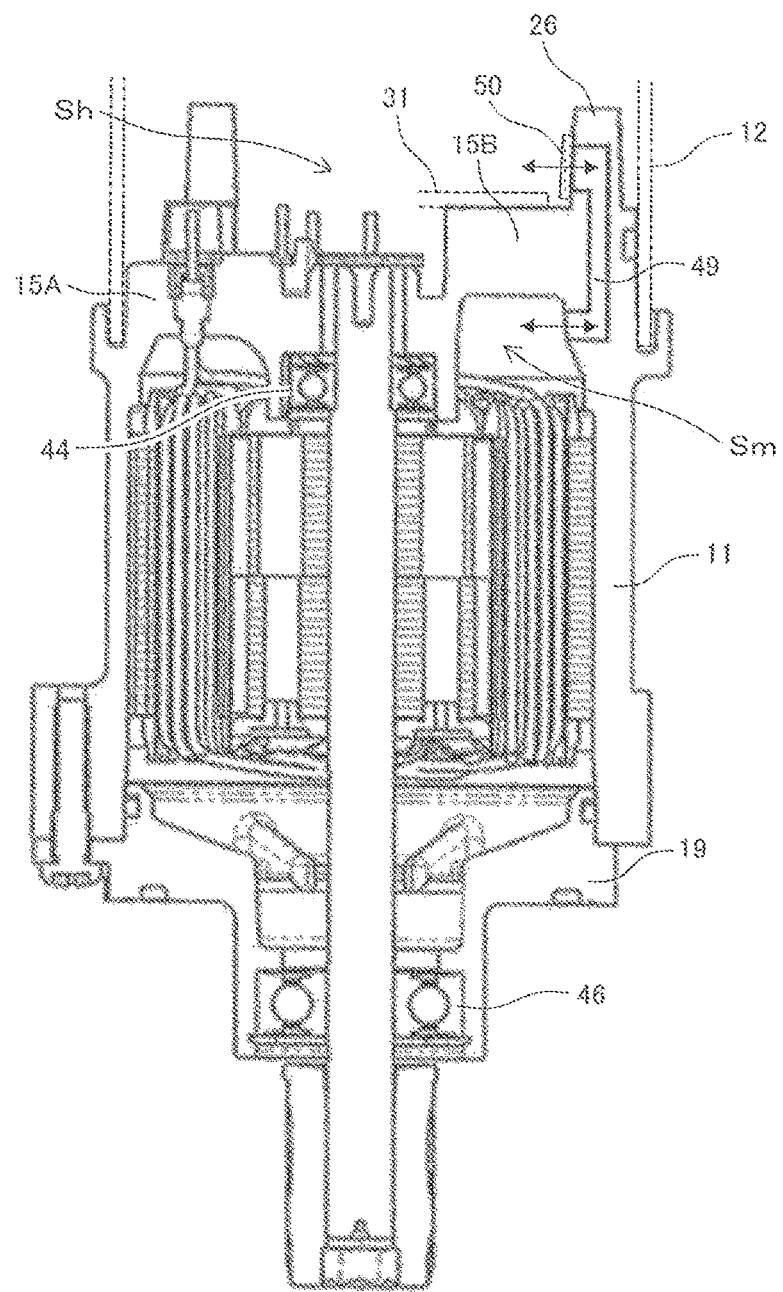
FIG. 11 is a sectional view for explaining an electric power steering device which is a second embodiment of the present invention. In addition, the electronic control unit is omitted.

In FIG. 11, a ventilation hole 49 is formed in the board fixing projection portion 26 along the axial direction (planted direction), and is perpendicularly turned from the middle so as to be communicated to the housing space Sh of the metal cover 12. Moreover, a waterproof moisture-permeable film 50 is provided to the opening end on the housing space Sh side of the metal cover 12. In addition, the waterproof moisture-permeable film 50 can be attached to the opening end on the housing space Sm side of the motor housing 11.

Here, as mentioned above, the board fixing projection portion 26 is formed with a bolt hole for the fixing of the glass epoxy board 34, and the ventilation hole 46 is turned before reaching this bolt hole. In addition, the bolt hole may be formed to extend so as to penetrate to the housing space Sm of the motor housing 11, and the opening is formed on the housing space Sh side of the metal cover 12 at the position before a fixing bolt is screwed, such that the bolt hole is also used as the ventilation hole 49. At any rate, in such a configuration, the housing space Sm of the motor housing 11 can be communicated with the housing space Sh of the metal cover 12.

Also in such an embodiment, since the housing space Sm of the motor housing 11 is fluidly connected to the housing space Sh of the metal cover 12 via the waterproof moisture-permeable film 50 and the ventilation hole 49 formed in the board fixing projection portion 26, without reducing the actual effective area of the end surface portion 15, by the waterproof moisture-permeable film 50 provided to the ventilation hole 49, the ventilation between the housing space Sm of the motor housing 11 and the housing space Sh of the metal cover 12 can be ensured, and in addition to this, a phenomenon in which water which has entered into the motor housing 11 also enters to the electronic control unit ECU side can be avoided.

In this way, since the ventilation hole 49 and the waterproof moisture-permeable film 50 are provided to the board fixing projection portion 26, they are covered with the metal cover 12 and are not exposed to the external environment. Consequently, a phenomenon in which the waterproof moisture-permeable film 50 is broken by flying rocks during traveling or clogs up by the splashing of muddy water can be avoided, and thereby the regular function of the waterproof moisture-permeable film 50 can be maintained over a long period of time.

Moreover, since the ventilation hole 49 is provided to the board fixing projection portion 26, the deterioration of heat radiation efficiency can be suppressed without inhibiting the heat radiation function of the end surface portion 15.

EXAMPLE 3

Next, a third embodiment of the present invention will be explained. In the first embodiment, the ventilation hole 42 is provided with a waterproof moisture-permeable film having both waterproof function and air permeable (moisture permeable) function in which the passage of air and water vapor is permitted and the passage of water is suppressed. However, in the third embodiment, by a labyrinth passage instead of the waterproof moisture-permeable film, the same working effect can be obtained. In addition, since the same symbols as the first embodiment are applied to the same components, their explanation is omitted.

Figure 12:
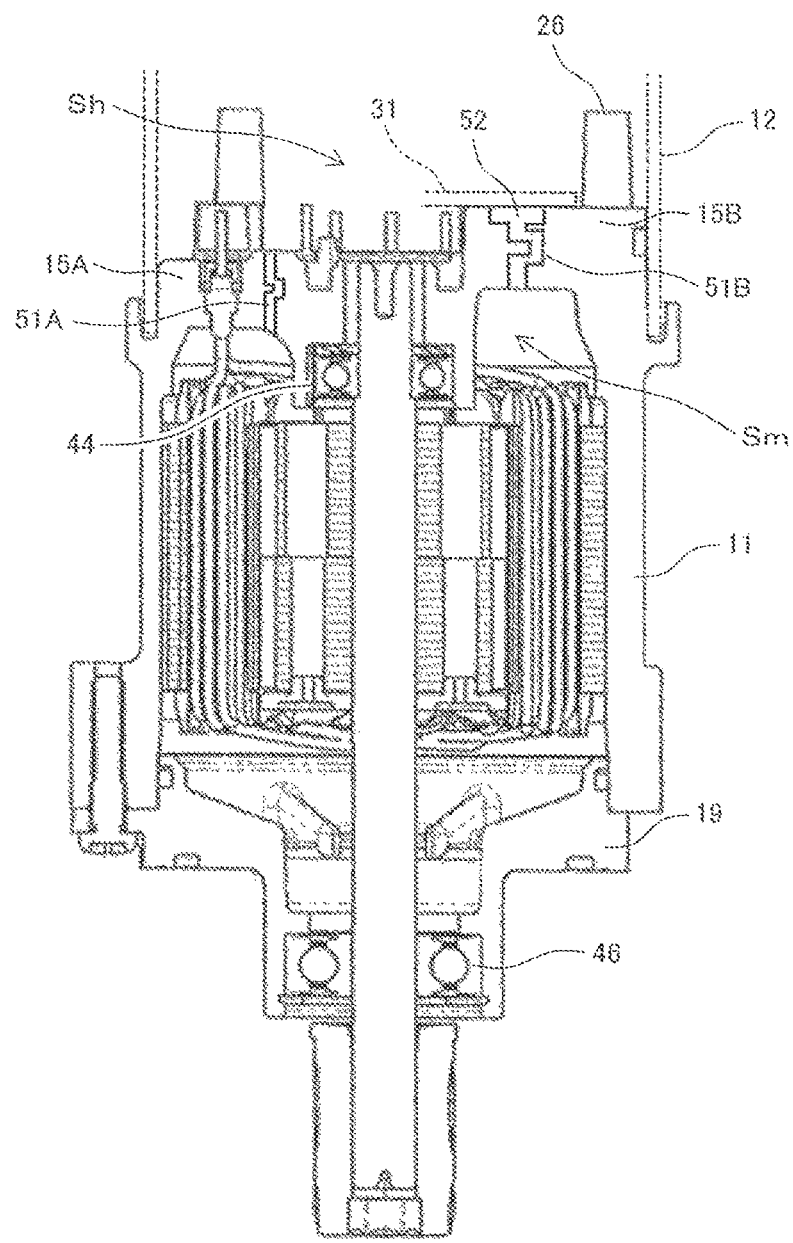
FIG. 12 is a sectional view for explaining an electric power steering device which is a third embodiment of the present invention. In addition, the electronic control unit is omitted.

In FIG. 12, a labyrinth passage 51A is formed in the wall surface in the power conversion heat radiation region 15A of the end surface portion 15 of the motor housing 11. This labyrinth passage 51A is configured to communicate the housing space Sm of the motor housing 11 with the housing space Sh of the metal cover 12. The labyrinth passage 51A is formed with at least one bent part in the passage, and by this bent part, a ventilation function and a water separation function can be obtained. That is, by forming the bent part, heavy materials, such as water, are separated by collision separation, and the passage of only air is permitted. Consequently, a phenomenon in which water which has entered into the motor housing 11 also enters on the electronic control unit ECU side can be avoided.

In addition, in the above embodiment, although the labyrinth passage 51A is provided in the power conversion heat radiation region 15A of the end surface portion 15, it can be provided in the power source heat radiation region 15B of the end surface portion 15. Similarly, as shown in FIG. 12, a labyrinth passage 15B is formed in the power source heat radiation region 15B of the end surface portion 15.

Here, a communication groove 52 communicated to the housing space Sh of the metal cover 12 is formed to the surface of the labyrinth passage 51B which is positioned on the metal cover 12 side of the power source heat radiation region 15B. That is, since the glass epoxy board 31 of the power source circuit part 17 is mounted in the power source heat radiation region 15B, there is a possibility that ventilation is inhibited. To avoid this, the communication groove 52 is formed such that the labyrinth passage 51B merges with the communication groove 52. Also in this configuration, a phenomenon in which water which has entered into the motor housing 11 also enters on the electronic control unit ECU side can be avoided without providing a waterproof moisture-permeable part.

Also in such a configuration, since the housing space Sm of the motor housing 11 is fluidly connected to the housing space Sh of the metal cover 12 via the labyrinth passage 51A or 51B formed to the end surface portion 15, by the labyrinth passage 51A or 51B, the ventilation between the housing space Sm of the motor housing 11 and the housing space Sh of the metal cover 12 can be ensured, and in addition to this, a phenomenon in which water which has entered into the motor housing 11 also enters on the electronic control unit ECU side can be avoided.

As mentioned above, in the present invention, on the opposite side to the output portion of the rotation shaft of the electric motor, the ventilation hole which communicates between the housing space for the electronic control unit and the housing space for the electric motor is formed in the end surface wall of the motor housing which separates the housing space for the electronic control unit and the housing space for the electric motor, and the waterproof moisture-permeable part which suppresses the passage of water and permits the passage of air and water vapor is provided to the ventilation hole.

According to the above configuration, since the ventilation hole including the waterproof moisture-permeable part is provided in the end surface wall of the motor housing, the influence of flying rocks and muddy water from the external environment can be eliminated, and the internal pressure fluctuation of the housing space for the electronic control unit ECU and the penetration of water into the housing space can be suppressed over a long period of time.

In addition, the present invention is not limited to the above embodiments, and various modifications are included. For example, the above embodiments have been explained in detail to facilitate understanding the present invention, and each of them is not always limited to one having all the configurations explained above. In addition, a part of the configuration of one embodiment can be replaced to the configuration of another embodiment. Moreover, the configuration of one embodiment can be also added to the configuration of another embodiment. Furthermore, adding, removing or replacement of another configuration can be possible relative to a part of the configuration of each of the embodiments.

EXPLANATION OF SINGS

6: Electric power steering device
8: Electric motor section
9: Electronic control section
11: Motor housing
12: Metal cover
13: Connector terminal assembly
14: Output portion
15: End surface portion
16: Power conversion circuit part
17: Power source circuit part
18: Control circuit part
19: End surface portion
20: Coil
21: Stator
22: Rotor
23: Rotation shaft
24: Rotation detection part
25: Through hole
26: Board fixing projection portion
27: Board receiving portion
28: Protruding heat radiation portion
29: Capacitor
30: Coil
31: Glass epoxy board
32: Microcomputer
33: Peripheral circuit
34: Glass epoxy board
35: Lid member
36: Resilient functional member
37: Magnet holding part
38: Permanent magnet
39: Magnetic sensor
40: Fixing hole
41: Through hole
42A, 42B, 49: Ventilation hole
48, 52: Communication groove
43A, 43B, 50: Waterproof moisture-permeable film
51, 51A: Labyrinth passage

The invention claimed is:

1. An electric drive device comprising:
a motor housing in which an electric motor for driving a mechanical system control element is accommodated;
a separation wall portion of the motor housing, the separation wall portion being formed on an opposite side to an output portion of a rotation shaft of the electric motor; and
an electronic control unit for driving the electric motor, which is accommodated in a housing space formed by a cover attached to the separation wall portion, and which is disposed so as to be adjacent to a side of the separation wall portion,
wherein the separation wall portion of the motor housing, which separates the housing space for the electronic control unit and a housing space for the electric motor, is formed with a ventilation hole communicating between the housing space for the electronic control unit and the housing space for the electric motor, and a waterproof ventilation part which suppresses passage of water and permits passage of air and water vapor is provided to the ventilation hole,
wherein the cover is fixed to the motor housing such that the electronic control unit is sealed water-tight, and
wherein, when the motor housing is attached to a steering apparatus, the housing space for the electronic control unit is communicated with (i) a steering-apparatus-side passage formed inside the steering apparatus and (ii) a steering-apparatus-side waterproof moisture-permeable film via (i) the housing space of the electric motor and (ii) a passage of a ball bearing along the rotation shaft of the electric motor.

2. The electric drive device according to claim 1, wherein the waterproof ventilation part is formed by a separation-wall-portion-side waterproof moisture-permeable film.

3. The electric drive device according to claim 2, wherein the separation-wall-portion-side waterproof moisture-permeable film is disposed to an opening end of the ventilation hole which is positioned on a housing space side of the motor housing or on a housing space side of the cover.

4. The electric drive device according to claim 1, wherein the waterproof ventilation part is formed by a labyrinth passage having at least one bent part.

5. The electric drive device according to claim 1, wherein the separation wall portion of the motor housing is formed with a board fixing portion to which a board of the electronic control unit is fixed, and the ventilation hole is formed inside the board fixing portion.

6. An electric drive device comprising:
a motor housing in which an electric motor for driving a mechanical system control element is accommodated;
a separation wall portion of the motor housing, the separation wall portion being formed on an opposite side to an output portion of a rotation shaft of the electric motor; and
an electronic control unit for driving the electric motor, which is accommodated in a housing space formed by a cover attached to the separation wall portion, is disposed so as to be adjacent to a side of the separation wall portion, and is composed of a control circuit part, a power source circuit part and a power conversion circuit part,
wherein the separation wall portion of the motor housing is formed with a power conversion heat radiation region and a power source heat radiation region, and the power conversion circuit part is disposed on the power conversion heat radiation region and the power source circuit part is disposed on the power source heat radiation region, wherein heat generated in the power conversion circuit part and the power source circuit part is radiated to the motor housing via the power conversion heat radiation region and the power source heat radiation region, wherein a ventilation hole communicating between the housing space for the electronic control unit and a housing space for the electric motor is formed in the power conversion heat radiation region or the power source heat radiation region of the separation wall portion of the motor housing which separates the housing space for the electronic control unit and the housing space for the electric motor, and a waterproof ventilation part which suppresses passage of water and permits passage of air and water vapor is provided to the ventilation hole, wherein the cover is fixed to the motor housing such that the electronic control unit is sealed water-tight, and wherein, when the motor housing is attached to a steering apparatus, the housing space for the electronic control unit is communicated with (i) a steering-apparatus-side passage formed inside the steering apparatus and (ii) a steering-apparatus-side waterproof moisture-permeable film via (i) the housing space of the electric motor and (ii) a passage of a ball bearing along the rotation shaft of the electric motor.

7. The electric drive device according to claim 6, wherein the waterproof ventilation part is formed by a separation-wall-portion-side waterproof moisture-permeable film.

8. The electric drive device according to claim 7, wherein the separation-wall-portion-side waterproof moisture-permeable film is disposed to an opening end of the ventilation hole which is positioned on a housing space side of the motor housing or on a housing space side of the cover.

9. The electric drive device according to claim 6, wherein the waterproof ventilation part is formed by a labyrinth passage having at least one bent part.

10. An electric power steering device comprising:
an electric motor for applying steering auxiliary force to a steering shaft based on an output from a torque sensor for detecting a rotation direction and a rotation torque of the steering shaft;
a motor housing in which the electric motor is accommodated;
a separation wall portion of the motor housing, the separation wall portion being formed on an opposite side to an output portion of a rotation shaft of the electric motor; and
an electronic control unit for driving the electric motor, which is accommodated in a housing space formed by a cover attached to the separation wall portion, and which is disposed so as to be adjacent to a side of the separation wall portion,
wherein the separation wall portion of the motor housing which separates the housing space for the electronic control unit and a housing space for the electric motor is formed with a ventilation hole communicating between the housing space for the electronic control unit and the housing space for the electric motor, and a waterproof ventilation part which suppresses passage of water and permits passage of air and water vapor is provided to the ventilation hole,
wherein the cover is fixed to the motor housing such that the electronic control unit is sealed water-tight, and
wherein, when the motor housing is attached to a steering apparatus, the housing space for the electronic control unit is communicated with (i) a steering-apparatus-side passage formed inside the steering apparatus and (ii) a steering-apparatus-side waterproof moisture-permeable film via (i) the housing space of the electric motor and (ii) a passage of a ball bearing along the rotation shaft of the electric motor.

11. The electric power steering device according to claim 10, wherein the waterproof ventilation part is formed by a separation-wall-portion-side waterproof moisture-permeable film.

12. The electric power steering device according to claim 11, wherein the separation-wall-portion-side waterproof moisture-permeable film is disposed to an opening end of the ventilation hole which is positioned on a housing space side of the motor housing or on a housing space side of the cover.

13. The electric power steering device according to claim 10, wherein the waterproof ventilation part is formed by a labyrinth passage having at least one bent part.

14. The electric power steering device according to claim 10, wherein the separation wall portion of the motor housing is formed with a board fixing portion to which a board of the electronic control unit is fixed, and the ventilation hole is formed inside the board fixing portion.

15. An electric power steering device comprising:
an electric motor for applying steering auxiliary force to a steering shaft based on an output from a torque sensor for detecting a rotation direction and a rotation torque of the steering shaft;
a motor housing in which the electric motor is accommodated;
a separation wall portion of the motor housing, the separation wall portion being formed on an opposite side to an output portion of a rotation shaft of the electric motor; and
an electronic control unit for driving the electric motor, which is accommodated in a housing space formed by a cover attached to the separation wall portion, is disposed so as to be adjacent to a side of the separation wall portion, and is composed of a control circuit part, a power source circuit part and a power conversion circuit part,
wherein the separation wall portion of the motor housing is formed with a power conversion heat radiation region and a power source heat radiation region, and the power conversion circuit part is disposed on the power conversion heat radiation region and the power source circuit part is disposed on the power source heat radiation region,
wherein heat generated in the power conversion circuit part and the power source circuit part is radiated to the motor housing via the power conversion heat radiation region and the power source heat radiation region,
wherein a ventilation hole communicating between the housing space for the electronic control unit and a housing space for the electric motor is formed in the power conversion heat radiation region or the power source heat radiation region of the separation wall portion of the motor housing which separates the housing space for the electronic control unit and the housing space for the electric motor, and a waterproof ventilation part which suppresses passage of water and permits passage of air and water vapor is provided to the ventilation hole, wherein the cover is fixed to the motor housing such that the electronic control unit is sealed water-tight, and wherein, when the motor housing is attached to a steering apparatus, the housing space for the electronic control unit is communicated with (i) a steering-apparatus-side passage formed inside the steering apparatus and (ii) a steering-apparatus-side waterproof moisture-permeable film via (i) the housing space of the electric motor and (ii) a passage of a ball bearing along the rotation shaft of the electric motor.

16. The electric power steering device according to claim 15, wherein the waterproof ventilation part is formed by a separation-wall-portion-side waterproof moisture-permeable film.

17. The electric power steering device according to claim 16, wherein the separation-wall-portion-side waterproof moisture-permeable film is disposed to an opening end of the ventilation hole which is positioned on a housing space side of the motor housing or on a housing space side of the cover.

18. The electric power steering device according to claim 15, wherein the waterproof ventilation part is formed by a labyrinth passage having at least one bent part.

\* \* \* \* \*